(12) United States Patent
Yamada et al.

(10) Patent No.: US 11,645,879 B2
(45) Date of Patent: May 9, 2023

(54) INFORMATION-PROCESSING DEVICE AND INFORMATION-PROCESSING METHOD FOR DETERMINING AN INSPECTION TIMING FOR AN AERIAL VEHICLE

(71) Applicant: NTT DOCOMO, INC., Tokyo (JP)

(72) Inventors: Takefumi Yamada, Tokyo (JP); Ken Koumoto, Tokyo (JP); Hidetoshi Ebara, Tokyo (JP); Youhei Oono, Toyko (JP); Yuichiro Segawa, Toyko (JP); Yukiko Nakamura, Toyko (JP); Shinya Hanano, Toyko (JP)

(73) Assignee: NTT DOCOMO, INC., Tokyo (JP)

( * ) Notice: Subject to any disclaimer, the term of this patent is extended or adjusted under 35 U.S.C. 154(b) by 259 days.

(21) Appl. No.: 16/955,233

(22) PCT Filed: Jan. 22, 2019

(86) PCT No.: PCT/JP2019/001814
§ 371 (c)(1),
(2) Date: Jun. 18, 2020

(87) PCT Pub. No.: WO2019/146581
PCT Pub. Date: Aug. 1, 2019

(65) Prior Publication Data
US 2020/0327747 A1     Oct. 15, 2020

(30) Foreign Application Priority Data

Jan. 23, 2018 (JP) .............................. JP2018-009015

(51) Int. Cl.
*G07C 5/08* (2006.01)
*B64F 5/60* (2017.01)
(Continued)

(52) U.S. Cl.
CPC ............. *G07C 5/0808* (2013.01); *B64F 5/60* (2017.01); *G07C 5/008* (2013.01); *G08G 5/0039* (2013.01); *G08G 5/0069* (2013.01); *G08G 5/045* (2013.01)

(58) Field of Classification Search
None
See application file for complete search history.

(56) References Cited

U.S. PATENT DOCUMENTS

| 9,310,222 | B1 * | 4/2016 | Suiter | G07C 5/0833 |
| 2007/0146167 | A1 * | 6/2007 | Miller | G08G 5/0078 |
| | | | | 340/963 |

(Continued)

FOREIGN PATENT DOCUMENTS

JP     2006082775 A     3/2006

OTHER PUBLICATIONS

Notice of Reasons for Refusal issued in corresponding Japanese Patent Application No. 2019-567083, dated Jul. 20, 2021.

(Continued)

*Primary Examiner* — Yuen Wong
*Assistant Examiner* — Hongye Liang
(74) *Attorney, Agent, or Firm* — Dilworth IP, LLC

(57) ABSTRACT

Flight control unit and flight unit start flight in accordance with a flight plan. Flight history acquisition unit acquires a flight history of drone. Flight plan acquisition unit acquires a flight plan for drone. Inspection timing determination unit calculates a difference between the acquired flight plan and the acquired flight history, and based on the difference, determines an inspection timing for drone. Inspection timing notification unit provides notification of the determined inspection timing.

19 Claims, 7 Drawing Sheets

(51) Int. Cl.
*G07C 5/00* (2006.01)
*G08G 5/00* (2006.01)
*G08G 5/04* (2006.01)

(56) References Cited

U.S. PATENT DOCUMENTS

2010/0174426 A1* 7/2010 Turung ................ G05D 1/0061
 701/19
2019/0033892 A1* 1/2019 Gomez Gutierrez .. G05D 1/101

OTHER PUBLICATIONS

International Search Report issued in corresponding PCT Application No. PCT/JP2019/001814, dated Mar. 12, 2019, 4 pages.

* cited by examiner (a)

| TEMPORAL DIFFERENCE | INSPECTION TIMING (T11<T12) |
|---|---|
| LESS THAN Th11 | NOT NECESSARY YET |
| Th11 OR MORE AND LESS THAN Th12 | AFTER FLIGHT TIME T12 |
| Th12 OR MORE AND LESS THAN Th13 | AFTER FLIGHT TIME T11 |
| Th13 OR MORE | NOW |

(b)

| SPATIAL DIFFERENCE | INSPECTION TIMING (T21<T22) |
|---|---|
| LESS THAN Th21 | NOT NECESSARY YET |
| Th21 OR MORE AND LESS THAN Th22 | AFTER FLIGHT TIME T22 |
| Th22 OR MORE AND LESS THAN Th23 | AFTER FLIGHT TIME T21 |
| Th23 OR MORE | NOW |

FIG. 5

| EMAIL APPLICATION |
|---|
| SENDER: XXXX<br>DESTINATION: XXXX<br>TITLE: NOTICE OF DRONE INSPECTION TIMING<br><br>THIS IS TO NOTIFY THAT AN INSPECTION TIMING FOR A DRONE (DRONE ID: ID001) HAS COME. |

FIG. 6

| FLIGHT SPEED | DIFFICULTY LEVEL | CORRECTION VALUE |
|---|---|---|
| 80% OR MORE OF MAXIMUM SPEED | Lv3 | 0.8 |
| 50% OR MORE AND LESS THAN 80% OF MAXIMUM SPEED | Lv2 | 0.9 |
| LESS THAN 50% OF MAXIMUM SPEED | Lv1 | 1.0 |

| ELAPSED TIME OF USE | DIFFICULTY LEVEL |
|---|---|
| LESS THAN T11 | Lv3 |
| T11 OR MORE AND LESS THAN T12 | Lv2 |
| T12 OR MORE | Lv1 |

| ELAPSED TIME OF USE | CORRECTION VALUE |
|---|---|
| LESS THAN T21 | 1.0 |
| T21 OR MORE AND LESS THAN T22 | 1.1 |
| T22 OR MORE | 1.2 |

| COMPONENT | CORRECTION VALUE |
|---|---|
| FRAME | 1.0 |
| BATTERY, SENSOR DEVICE | 1.2 |
| MOTORS, ROTORS, PROCESSOR | 1.4 |

| DIFFERENCE FOR UNPLANNED-FLIGHT HISTORY | INSPECTION TIMING |
|---|---|
| LESS THAN Th31 | NOT NECESSARY YET |
| Th31 OR MORE AND LESS THAN Th32 | AFTER FLIGHT TIME T3 |
| Th32 OR MORE | NOW |

INFORMATION-PROCESSING DEVICE AND INFORMATION-PROCESSING METHOD FOR DETERMINING AN INSPECTION TIMING FOR AN AERIAL VEHICLE

TECHNICAL FIELD

The present invention relates to a technique for managing an aerial vehicle.

BACKGROUND

Known in the art is a technique for managing an aerial vehicle. JP 2006-82775 A1 discloses collecting information such as an engine speed, an amount of remaining fuel, and a voltage from an unmanned aerial vehicle, determining flight conditions based on the collected information, and upon detecting that the flight conditions do not satisfy a predetermined safety standard, issuing a warning.

SUMMARY OF INVENTION

In the technique disclosed in Patent Document 1, safety inspection of an aerial vehicle is made during a flight. As an aerial vehicle such as a drone continues to fly, its main body and parts deteriorate over time. To ensure safe flight, it is necessary to inspect the aerial vehicle at an appropriate timing so that necessary repairs and replacements can be made.

An objective of the present invention is to support determination of a timing for inspecting an aerial vehicle.

To achieve the objective, the present invention provides an information-processing device comprising: an acquisition unit configured to acquire a flight plan and a flight history, the flight history being a history of flight made by an aerial vehicle based on the flight plan; and a determination unit configured to determine an inspection timing for the aerial vehicle based on a difference between an acquired flight plan and an acquired flight history.

The acquired flight plan and the acquired flight history may include plural items, a difference may be calculated for each of the plural items, and the determination unit may be configured to determine, based on a difference calculated for one of the plural items, an inspection timing for a component of the aerial vehicle, the component corresponding to the one of the plural items.

The aerial vehicle may have a function of avoiding a collision with an obstacle, and the determination unit may be configured to subtract a difference caused by avoiding a collision with an obstacle from the difference between the acquired flight plan and the acquired flight history, and to determine an inspection timing based on a result of the subtraction.

The determination unit may be configured, upon detecting that the aerial vehicle has flown during a time period when there is specific weather, to subtract a difference made during the time period from the difference between the acquired flight plan and the acquired flight history, and to determine an inspection timing based on a result of the subtraction.

The determination unit may be configured to: correct the difference based on a difficulty level of the acquired flight plan, an amount of correction increasing in proportion to the difficulty level; and to determine an inspection timing based on the corrected difference.

The acquired flight plan may refer to a flight plan whose difficulty level has been lowered in accordance with a time that has elapsed since the aerial vehicle started to be used, and the determination unit may be configured to correct the difference based on the elapsed time, an amount of correction decreasing in proportion to the elapsed time; and to determine an inspection timing based on the corrected difference.

The acquired flight plan may refer to a flight plan whose difficulty level has been lowered in accordance with a time that has elapsed since a component of the aerial vehicle started to be used, and the determination unit may be configured to correct the difference based on the elapsed time and an importance level of the component, an amount of correction decreasing in proportion to the elapsed time and the importance level; and to determine an inspection timing based on the corrected difference.

The aerial vehicle may refer to one of aerial vehicles that are classified into groups by flight performance, the acquisition unit may be further configured to acquire an unplanned-flight history for the aerial vehicle, the unplanned-flight history being a history of flight not following the flight plan, and the determination unit may be configured to determine an inspection timing based on the difference and a difference between an acquired unplanned-flight history and a flight history of another aerial vehicle that belongs to a same group as the aerial vehicle.

The present invention provides an information-processing method comprising: acquiring a flight plan and a flight history, the flight history being a history of flight made by an aerial vehicle based on the flight plan; and determining an inspection timing for the aerial vehicle based on a difference between the acquired flight plan and the acquired flight history.

The present invention makes it possible to support determination of a timing for inspecting an aerial vehicle.

BRIEF DESCRIPTION OF THE DRAWINGS

FIG. 5 is a diagram showing an example of an inspection timing table in accordance to the present invention.

FIG. 6 is a diagram showing an example of displayed notification information in accordance to the present invention.

DETAILED DESCRIPTION

[1] Embodiment

Figure 1:
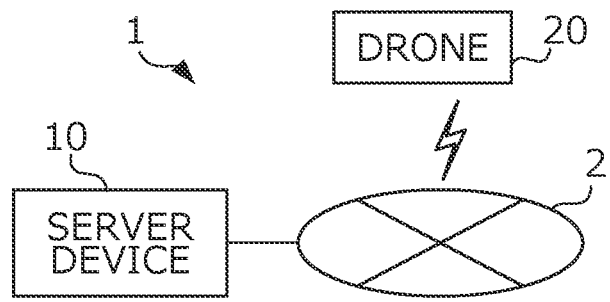
FIG. 1 is a diagram showing a configuration of a drone management system according to an embodiment of the present invention.

FIG. 1 shows a configuration of drone management system 1 according to an embodiment, which is a system for managing drones. A drone is an unmanned device that can fly autonomously in accordance with a flight plan, and is an example of an "aerial vehicle" of the present invention. The drone is used for landscape photography, surveying, monitoring or transportation.

Drone management system 1 includes network 2, server device 10, and drone 20. Network 2 is a communication system that includes a mobile communication network and the Internet, and relays data exchanged between devices that have access to the system. Server device 10 accesses network 2 by wired or wireless communication, and drone 20 accesses network 2 by wireless communication.

Drone 20 is a rotary-wing aerial vehicle that includes one or more rotary wings and flies under rotation of the rotary wings. Drone 20 is equipped to function for a specified flight purpose. For example, drone 20 when used for photography, surveying, or monitoring is equipped to take images, and drone 20 when used for transportation is equipped to hold and transport an object. Server device 10 is an information-processing device that performs various processes for managing drones 20.

Drone 20 is configured from multiple parts such as a frame, a motor(s), a rotor(s) (which may be referred to as a propeller or a blade), and a battery. With repeated flight, each of these parts is subject to deterioration and possible consequent failure; accordingly, it is necessary to periodically inspect drone 20 and repair or replace parts as required. However, inspecting drone 20 prior to each flight is both time and labor consuming. To obviate the need to make inspections prior to each flight, server device 10 performs processing to determine an inspection timing so that a number or inspections can be reduced.

Figure 2:
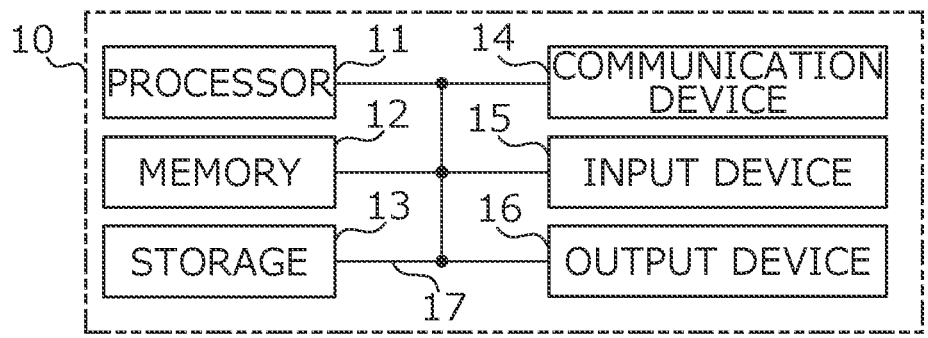
FIG. 2 is a diagram showing a hardware configuration of a server device in accordance to the present invention.

FIG. 2 shows a hardware configuration of server device 10, which is a computer that includes processor 11, memory 12, storage 13, communication device 14, input device 15, output device 16, and bus 17. It is of note that the term "device" may refer to a circuit or a unit. It is also of note that there may be one or more of each of the devices, and some of the devices may not be included.

Processor 11 controls a computer, for example, by causing an operating system to run. Processor 11 may include a central processing unit (CPU) that includes interfaces for connection to peripheral devices, a control device, an arithmetic device, and a register. Processor 11 retrieves programs (program codes), software modules, and data from storage 13 and/or communication device 14 to memory 12, and performs a variety of processing thereon.

The number of processors 11 used for performing the variety of processing may be one or more, and two or more processors 11 may perform the variety of processing either simultaneously or sequentially. Processor 11 may be constituted of one or more chips. The programs may be transmitted from a network via a telecommunication line.

Memory 12 is a computer-readable recording medium, and may include at least one of a read only memory (ROM), an erasable programmable ROM (EPROM), an electrically erasable programmable ROM (EEPROM), and a random access memory (RAM). Memory 12 may be referred to variously as a register, a cache, or a main memory (a main storage device). Memory 12 is able to store the programs (program codes), the software modules, and the data.

Storage 13 is a computer-readable recording medium, and may include at least one of an optical disk, such as a compact disc ROM (CD-ROM), a hard disk drive, a flexible disk, a magneto-optical disk (for example, a compact disk, a digital versatile disk, a Blu-ray (registered trademark) disk), a smart card, a flash memory (for example, a card, a stick, or a key drive), a floppy (registered trademark) disk, and a magnetic strip.

Storage 13 may be referred to as an auxiliary storage device. The recording medium may refer to a database including memory 12 and/or storage 13, a server, or any other suitable medium. Communication device 14 is hardware (a transmission/reception device) that enables communication between computers via a wired and/or wireless network, and is also referred to as, for example, a network device, a network controller, a network card, or a communication module.

Input device 15 is an input device for receipt of an input, such as a keyboard, a mouse, a microphone, a switch, a button, or a sensor. Output device 16 is a device that performs output, such as a display or a speaker. It is of note that input device 15 and output device 16 may together constitute a device such as a touch screen. The devices such as processor 11 and memory 12 are able to connect and communicate with each other via bus 17. Bus 17 may be a single bus, or may be constituted of plural buses for device connection and communication.

Figure 3:
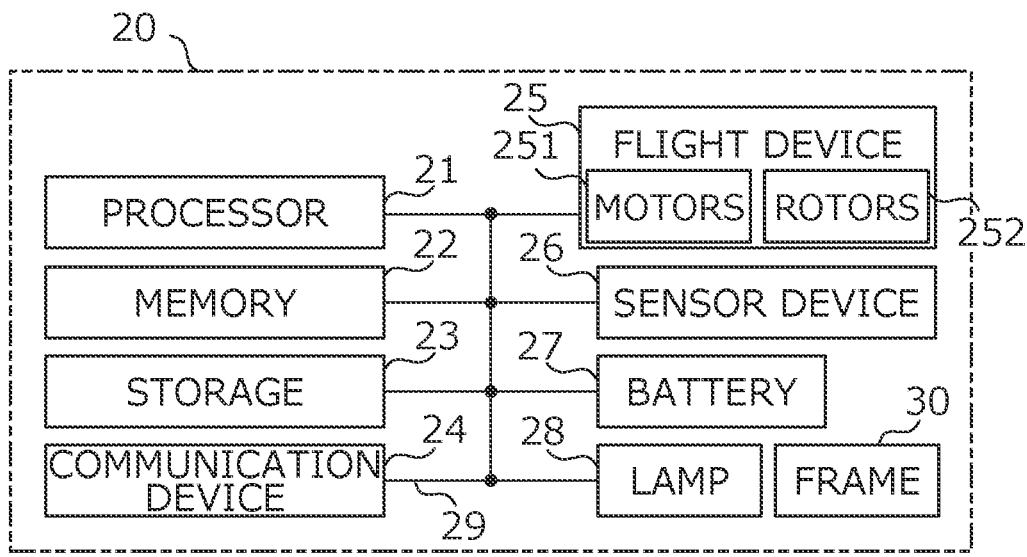
FIG. 3 is a diagram showing a hardware configuration a done in accordance to the present invention.

FIG. 3 shows a hardware configuration of drone 20, which is a computer that includes processor 21, memory 22, storage 23, communication device 24, flight device 25, sensor device 26, battery 27, lamp 28, bus 29, and frame 30. It is of note that the term "device" may be read to mean a circuit or a unit. It is also of note that there may be one or more of each of the devices, and some of the devices may not be included.

Processor 21, memory 22, storage 23, communication device 24, and bus 29 constitute the same type of hardware (performance and specifications are not necessarily the same) as a device of the same name shown in FIG. 2. Communication device 24 enables wireless communication between drones in addition to wireless communication with network 2. Flight device 25 is a device that enables the drone to fly, and includes motors 251 and rotors 252. Flight device 25 enables the drone to move in any direction when airborne, or to hover when airborne.

Sensor device 26 is a device that includes sensors for acquiring information necessary for flight control. Sensor device 26 includes a position sensor for measuring a position (a latitude and a longitude) of the drone, a direction sensor for measuring a direction in which (the front side of) the drone faces, an altitude sensor for measuring an altitude of the drone, a speed sensor for measuring a speed of the drone, and an inertial measurement sensor (or an inertial measurement unit) for measuring a three-axis angular velocity and a three-direction acceleration.

Battery 27 is a device that stores electric power for supply to components of drone 20. Lamp 28 is a light emitting component such as a light emitting diode (LED), and when an inspection for drone 20 is due lamp 28 displays a continuous light or flashes. Lamp 28 will be described in detail later. Frame 30 is a housing in which components of drone 20 are either housed or mounted.

It is also of note that each of server device 10 and drone 20 may include hardware such as a microprocessor, a digital signal processor (DSP), an application specific integrated circuit (ASIC), a programmable logic device (PLD), or a field programmable gate array (FPGA). The hardware may provide some or all of the functional blocks. For example, processor 11 may be constituted of at least one of the items of the hardware.

Each of server device 10 and drone 20 included in drone management system 1 stores a program for the system, and a processor of each device executes a corresponding program to control component, thereby providing functions as described below.

Figure 4:
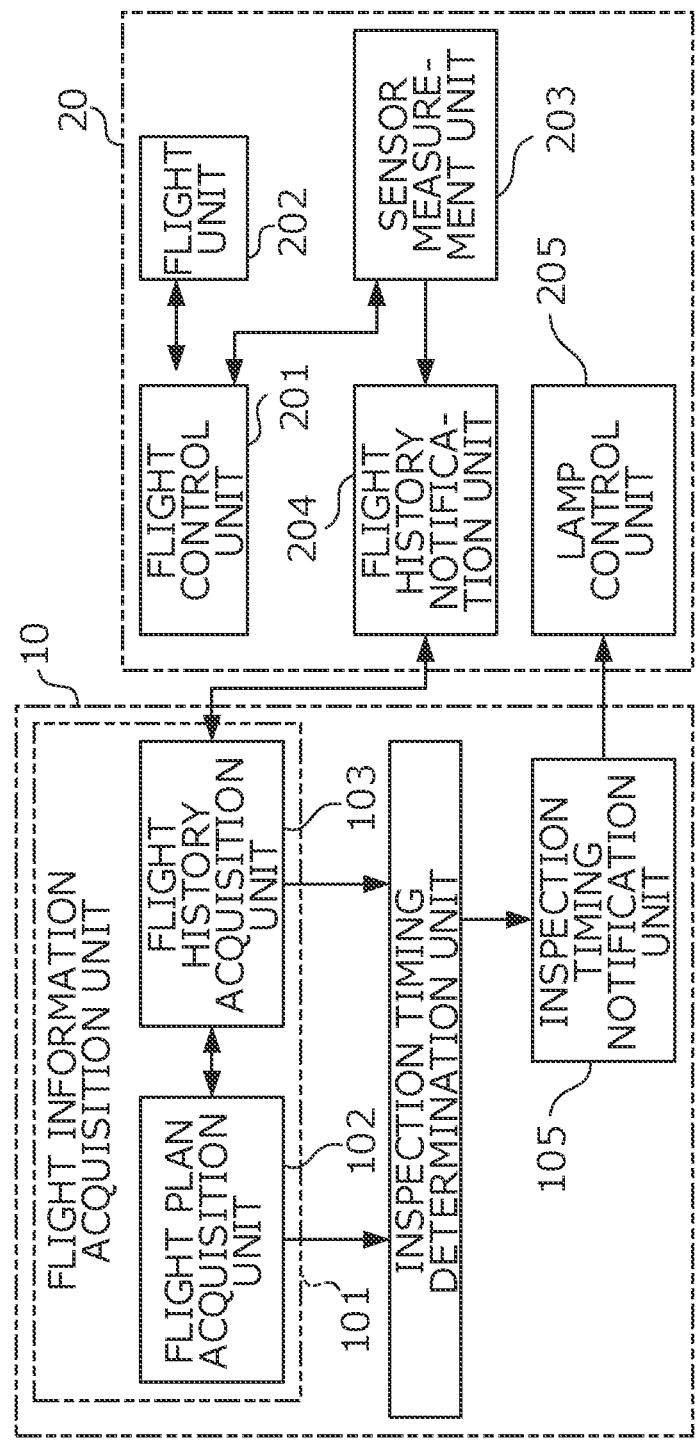
FIG. 4 is a diagram showing a functional configuration of the drone management system in accordance to the present invention.

FIG. 4 shows a functional configuration of drone management system 1. Server device 10 includes flight information acquisition unit 101, inspection timing determination unit 104, and inspection timing notification unit 105. Flight information acquisition unit 101 includes flight plan acquisition unit 102 and flight history acquisition unit 103.

Drone 20 includes flight control unit 201, flight unit 202, sensor measurement unit 203, flight history notification unit 204, and lamp control unit 205. Flight control unit 201 controls flight of drone 20. Specifically, flight control unit 201 receives a flight instruction from, for example, a system of an operator of flight of drone 20, and in response to the flight instruction, controls flight of drone 20 in accordance with a flight path and a flight time period indicated by a flight plan (described later).

Flight unit 202 enables drone 20 to fly. More specifically, in the present embodiment, flight unit 202 enables drone 20 to fly by use of motors 251 and rotors 252 included in flight device 25. Sensor measurement unit 203 measures a position, a direction, an altitude, a speed, an angular velocity, and an acceleration of drone 20 at predetermined time intervals by use of the sensors (the position sensor, the direction sensor, the altitude sensor, the speed sensor, and the inertial measurement sensor) included in sensor device 26.

Sensor measurement unit 203 provides sensor information indicating the measured position, direction, altitude, speed, angular velocity, and acceleration to flight control unit 201 and flight history notification unit 204. Flight control unit 201 controls flight unit 202 based on the provided sensor information so that drone 20 flies along a flight path indicated by a flight plan. Flight history notification unit 204 notifies a flight history of drone 20 to server device 10 based on the provided sensor information.

The term "flight history" as used herein refers to information that indicates a flight path along which drone 20 passes during flight, times (passage times) at which drone 20 passes over positions along the flight path, and flight speeds that are measured at the flight path positions. The flight path and the flight speeds are indicated as positions, altitudes, and speeds by way of sensor information. Each time sensor information is provided, flight history notification unit 204 adds a current time to sensor information as a passage time, to generate flight history information.

Flight history notification unit 204 sends generated flight history information to server device 10, together with information (for example, a drone ID) to identify drone 20. Upon receipt of the flight history information, flight history acquisition unit 103 of server device 10 acquires a flight history of drone 20 from the flight history information. Flight history acquisition unit 103 provides the acquired flight history to inspection timing determination unit 104.

Flight history acquisition unit 103 also provides a drone ID associated with the acquired flight history to flight plan acquisition unit 102. Upon receipt of the drone ID, flight plan acquisition unit 102 acquires a flight plan for flying drone 20 indicated by the drone ID. A flight plan for a transportation flight consists of information on a flight path from a departure site to a destination site and a flight time period (a time period from a departure time to a scheduled delivery time) for completion of travel along the flight path.

A flight plan used for surveying or monitoring consists of information on a flight path and a flight time period taken for a round trip flight to a surveying or monitoring site, and a flight path and a flight time period for a flight within the site. Flight plan acquisition unit 102 requests a flight plan for drone 20 indicated by the drone ID from, for example, the operator who operates drone 20. Flight plan acquisition unit 102 acquires the flight plan sent from the operator in response to the request. Flight plan acquisition unit 102 provides the acquired flight plan to inspection timing determination unit 104.

The acquired flight plan is a flight plan for drone 20 whose flight is recorded in the acquired flight history. In other words, the acquired flight history is a flight history of drone 20 that has flown in accordance with the acquired flight plan. Flight information acquisition unit 101 acquires the flight plan and the flight history of drone 20 that has flown in accordance with the flight plan. Flight information acquisition unit 101 is an example of an "acquisition unit" according to the present invention.

It is of note that the flight plan may be acquired before the full flight history. In that case, flight plan acquisition unit 102 acquires the flight plan associated with the drone ID of drone 20, and provides the drone ID to flight history acquisition unit 103. Flight history acquisition unit 103 requests the flight history from drone 20 indicated by the provided drone ID. By receiving flight history information sent from drone 20 in response to the request, flight history acquisition unit 103 acquires the flight history.

Alternatively, flight plan acquisition unit 102 and flight history acquisition unit 103 may acquire the flight plan and the flight history separately. The flight plan and the flight history are associated with an identical drone ID, and the flight history indicates a history of drone 20 that has flown in accordance with the flight plan. Flight information acquisition unit 101 provides the acquired flight plan and the acquired flight history to inspection timing determination unit 104.

The inspection timing determination unit 104 determines a difference between the flight plan and the flight history acquired by flight information acquisition unit 101, and based on the difference, determines an inspection timing for drone 20 whose flight history has been acquired. Inspection timing determination unit 104 is an example of a "determination unit" according to the present invention. The difference between the flight plan and the flight history is divided into two categories: one is a temporal difference and the other is a spatial difference.

The temporal difference refers to, for example, a difference between an estimated time of arrival at a destination defined in the flight plan and an actual arrival time indicated in the flight history. It is of note that in a case where a transit point and an estimated time of arrival at the transit point are defined in the flight plan, the temporal difference may refer to a difference between the estimated time of arrival at the transit point and an actual arrival time indicated in the flight history. Plural transit points may be defined in the flight plan.

The spatial difference refers to, for example, a distance between a flight route (a linear route defined in a space) defined in the flight plan and an actual flight route. More specifically, the spatial difference refers to an average or total of distances that fluctuate during flight. In the present embodiment, inspection timing determination unit 104 calculates a total of temporal differences at a destination and a transit point as the temporal difference. Inspection timing determination unit 104 also calculates an average of distances between a scheduled flight route and an actual flight route as the spatial difference.

Inspection timing determination unit 104 pre-stores a first inspection timing table in which temporal differences are associated with inspection timings, and a second inspection timing table in which spatial differences are associated with inspection timings. Inspection timing determination unit 104 determines an inspection timing using these tables.

FIG. 5 shows an example of the inspection timing tables. FIG. 5(a) shows an example of the first inspection timing table in which ranges of a temporal difference "less than Th11," "Th11 or more and less than Th12," "Th12 or more and less than Th13," and "Th13 or more" (which are arranged in ascending order of a temporal difference) are associated with inspection timings "not necessary yet," "after flight time T12," "after flight time T11" (T11 is shorter than T12), and "now." In this table, the inspection timing "after flight time T11" comes before "after flight time T12."

FIG. 5 (b) shows an example of the second inspection timing table in which ranges of a spatial difference "less than Th21," "Th21 or more and less than Th22," "Th22 or more and less than Th23," and "Th23 or more" (which are arranged in ascending order of a temporal difference) are associated with inspection timings "not necessary yet," "after flight time T22," "after flight time T21" (T21 is shorter than T22), and "now." In this table, the inspection timing "after flight time T21" comes before "after flight time T22."

Inspection timing determination unit 104 retrieves an inspection timing associated with the calculated temporal difference from the first inspection timing table. Inspection timing determination unit 104 also retrieves an inspection timing associated with the calculated spatial difference from the second inspection timing table. Inspection timing determination unit 104 determines one of the retrieved inspection timings that comes earlier to be an inspection timing for drone 20 whose flight history has been acquired.

For example, upon detecting that the temporal difference is associated with the timing "not necessary yet," and the spatial difference is associated with the timing "after flight time T22," inspection timing determination unit 104 determines the timing "after flight time T22" to be an inspection timing. In another example, upon detecting that the temporal difference is associated with the timing "after flight time T11," and the spatial difference is associated with the timing "after flight time T21," inspection timing determination unit 104 determines a timing after one of times T11 and T21 that is shorter, to be an inspection timing.

In another example, upon detecting that either one of the differences is associated with the timing "now," inspection timing determination unit 104 determines the timing "now" to be an inspection timing. As is clear from the foregoing, inspection timing determination unit 104 determines a timing that is set earlier in proportion to a temporal difference or a spatial difference, to be an inspection timing. Inspection timing determination unit 104 provides the determined inspection timing to inspection timing notification unit 105.

Inspection timing notification unit 105 provides notification of the inspection timing determined by inspection timing determination unit 104. For example, in a case where an address (for example, an email address) of the operator is pre-registered as a notification destination, inspection timing notification unit 105 generates notification information (for example, an email) to provide notification of the inspection timing, and sends the notification information to the registered address. The operator browses the notification information on a terminal display.

FIG. 6 shows an example of the displayed notification information. FIG. 6 shows a screen of an email application including an email titled "notice of drone inspection timing." The email includes a message "this is to notify that an inspection timing for a drone (drone ID: ID001) has come," which is notification information indicating that an inspection timing is "now," and information (a drone ID) identifying drone 20 to be inspected.

Inspection timing notification unit 105, upon detecting that an inspection timing is "now," also provides notification of the inspection timing by use of drone 20. Specifically, inspection timing notification unit 105 generates instruction data to cause a lamp to light up or blink, and sends the instruction data to drone 20. Lamp control unit 205 of drone 20 controls lamp 28 shown in FIG. 3.

Upon receiving the instruction data, lamp control unit 205 causes lamp 28 to light up or blink in accordance with the instruction data. The operator of drone 20 is informed in advance that illumination or blinking of lamp 28 indicates that an inspection is due. Instead of the advance notice, a label "inspection needed" may be provided around lamp 28 to clarify that illumination or blinking of lamp 28 indicates that an inspection is due.

The operator has maintenance staff for drone 20, who inspects drone 20 in response to notification that an inspection is due. Specifically, the maintenance staff inspects damage on motors 251, sound of driving motors 251, damage on rotors 252, damage on frame 30, corrosion of an electrical system, and entry of water into the electrical system. The maintenance staff also performs calibration of the IMU to correct a deviation of the IMU.

The foregoing devices of drone management system 1 perform a determination and notification process for determining and notifying an inspection timing for drone 20.

Figure 7:
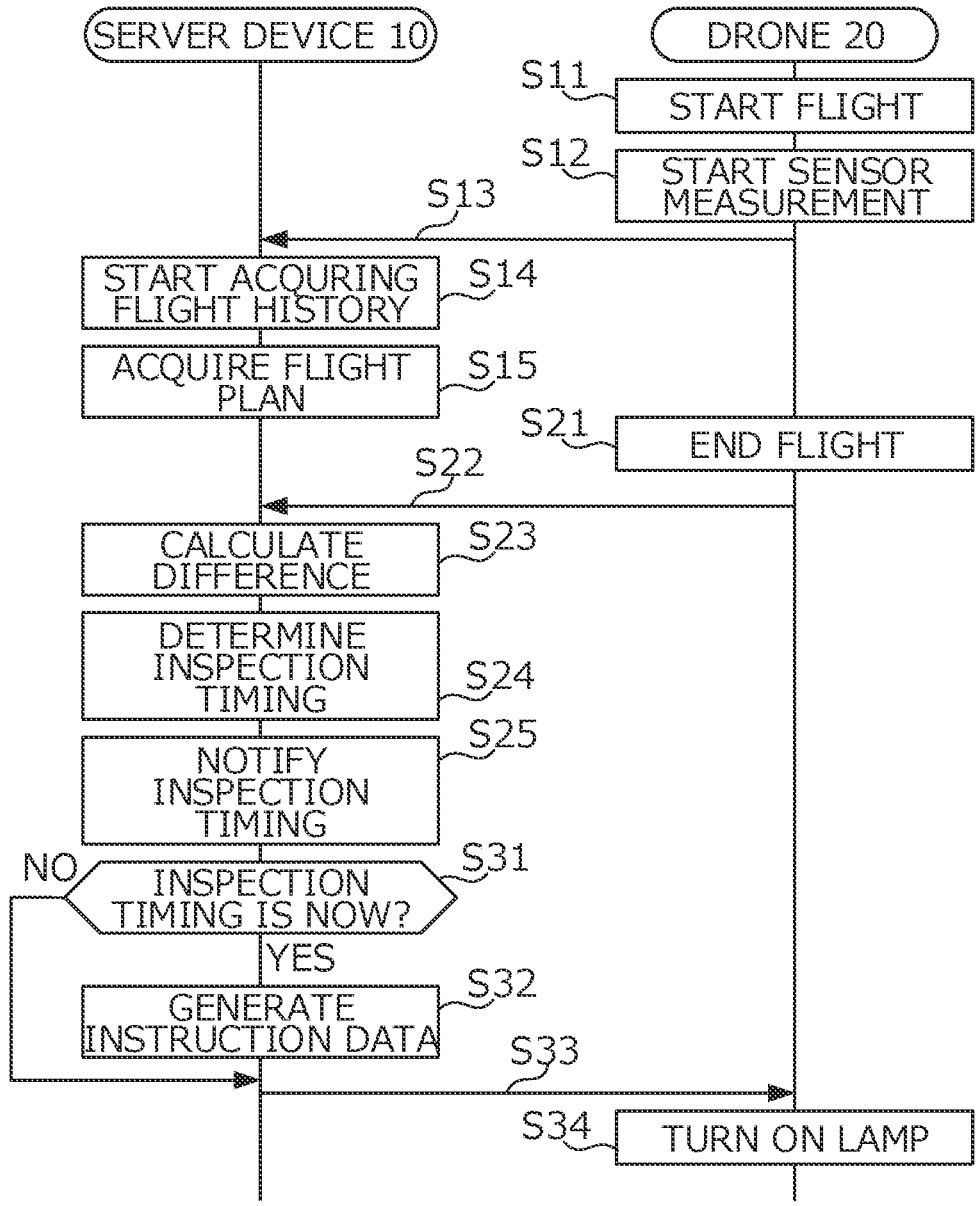
FIG. 7 is a diagram showing an example of a procedure of operations performed by each device in a determination and notification process in accordance to the present invention.

FIG. 7 shows an example of a procedure of operations performed by each device in the determination and notification process. The procedure shown starts at a flight start time for drone 20. Initially, drone 20 (flight control unit 201 and flight unit 202) starts flight in accordance with a flight plan (step S11).

Subsequently, drone 20 (sensor measurement unit 203) starts measurement by use of the sensors included in sensor device 26 (step S12). Subsequently, drone 20 (flight history notification unit 204) starts generation of flight history information including values measured at step S12 and transmission of the flight history information to server device 10 (step S13). Server device 10 (flight history acquisition unit 103) starts receiving flight history information from drone 20 to acquire a flight history (step S14). The operations from steps S12 to S14 are repeated during the flight of drone 20.

Server device 10 (flight plan acquisition unit 102) acquires a flight plan for drone 20 whose flight history has been acquired (step S15). Later, drone 20 (flight control unit 201 and flight unit 202) finishes its flight in accordance with the flight plan (step S21). Subsequently, drone 20 (flight history notification unit 204) sends last flight history information to server device 10 (step S22).

Upon receiving the last flight history information, server device 10 (inspection timing determination unit 104) calculates a difference between the flight plan acquired at step S15 and the flight history acquired at step S14 (step S23), and based on the difference, determines an inspection timing for drone 20 whose flight history has been acquired (step S24). Server device 10 (inspection timing notification unit 105) provides notification of the inspection timing determined at step S24 (step S25). At step S25, server device 10 sends notification information (for example, see FIG. 6).

Subsequently, server device 10 (inspection timing notification unit 105) determines whether it has been determined at step S24 that an inspection is due (step S31). If it has not been determined that an inspection time is due, the present procedure ends. On the other hand, if it has been determined that an inspection is due, server device 10 (inspection timing notification unit 105) generates instruction data to cause a lamp to light up (step S32), and sends the instruction data to drone 20 (step S33). Upon receiving the instruction data, drone 20 (lamp control unit 205) causes lamp 28 to light up in accordance with the instruction data to notify that an inspection is due (step S34).

Performance of drone 20 declines due to deterioration or breakage of components of drone 20. As the performance declines, drone 20 becomes unable to fly in accordance with a flight plan, so that a difference between the flight plan and a flight history of drone 20 becomes larger. In the present embodiment, an inspection timing is determined based on the difference, as described in the foregoing. Specifically, a timing that is set in proportion to the difference is determined as an inspection timing.

The determination method makes it possible that an inspection is performed earlier in proportion to a decline in performance of drone 20. This prevents the difference between the flight plan and the flight history from becoming larger, compared to a case where the determination method is not employed. Also, this reduces a possibility that drone 20 may crash due to a decline in performance. In short, the present embodiment supports determination of an inspection timing for drone 20.

[2] Modifications

The above embodiment is merely one example of an embodiment of the present invention. The above embodiment may be modified as described below.

[2-1] Determination for Each Component

In the above embodiment, inspection timing determination unit 104 determines an inspection timing for drone 20; however, this method of determination is merely an example. Drone 20 includes plural components such as processor 21, memory 22, storage 23, motors 251, rotors 252, sensor device 26, battery 27, and frame 30 (which may be referred to as a main body and parts). Inspection timing determination unit 104 may determine an inspection timing for each of those components.

A flight plan and a flight history include two items of a flight time period that is a temporal plan or history (a scheduled flight time period or an actual flight time period of drone 20) and a flight route that is a spatial plan or history (a scheduled flight route or an actual flight route of drone 20), as described above. A difference between the flight plan and the flight history is identified for each of the items. For example, a temporal difference and a spatial difference are identified, as shown in FIG. 5.

In the present modification, inspection timing determination unit 104 determines an inspection timing based on a difference of an item, for a component of drone 20 corresponding to the item. For example, drone 20 needs to fly fast enough to complete its flight within a flight time period. To enable drone 20 to fly at a required speed, motors 251, rotors 252, battery 27, and frame 30 need to be in a good condition, and sensor device 26 needs to be in such a condition that it can accurately measure values. For this reason, those components correspond to an item of a flight time period that is a temporal plan or history.

Inspection timing determination unit 104 determines an inspection timing based on a calculated temporal difference, for components corresponding to the temporal difference, which include motors 251, rotors 252, sensor device 26, battery 27, and frame 30. Inspection timing determination unit 104 makes the determination by use of, for example, an inspection timing table (for example, see FIG. 5(a)) in which temporal differences are associated with inspection timings. In the table, the same threshold values as those shown in FIG. 5(a) may be used, or different threshold values may be used. Threshold values used in the table may differ for each of components.

To enable drone 20 to fly along a scheduled flight route, sensor device 26 needs to accurately measure values, and processor 21, memory 22, and storage 23 need to cooperate to rapidly perform processing for flight control. For this reason, these components correspond to an item of a flight route that is a spatial plan or history. Inspection timing determination unit 104 determines an inspection timing based on a calculated spatial difference, for components corresponding to the spatial difference, which include processor 21, memory 22, storage 23, and sensor device 26.

Inspection timing determination unit 104 makes the determination by use of, for example, an inspection timing table (for example, see FIG. 5(b)) in which spatial differences are associated with inspection timings. In the table, the same threshold values as those shown in FIG. 5(b) may be used, or different threshold values may be used. Threshold values used in the table may differ for each of components. It is of note that the above items included in the flight plan and the flight history are merely examples.

As another item, a flight speed (to which motors 251, rotors 252, and sensor device 26 correspond) or a flight altitude (to which processor 21, memory 22, storage 23, and sensor device 26 correspond) may be referred to. Alternatively, as other items, a landing site and a landing time may be referred to. In that case, inspection timing determination unit 104 calculates a distance between a landing site and a scheduled destination, and a difference between an estimated arrival time and an actual landing time, as differences between a flight plan and a flight history.

Inspection timing determination unit 104 determines an inspection timing for, for example, battery 27 as a component corresponding to those items. To determine an inspection timing, inspection timing determination unit 104 determines whether one of the differences is equal to or greater than a threshold value. Upon determining that one of the differences is equal to or greater than the threshold value, which determination means that drone 20 has made an emergency landing due to lack of electricity, inspection timing determination unit 104 determines that an inspection timing is now. In either case, by calculating a difference for each item, components whose low performance is shown are extracted. Accordingly, components to be inspected are reduced so that inspection work is made easier, compared to a case where low performance is shown for the entirety of drone 20.

[2-2] Collision Avoidance Function

Drone 20 may have an avoidance function to autonomously avoid an obstacle such as another drone 20, another type of flying object (for example, a bird), a tree, or a building. In a case where drone 20 is provided with such a function, a flight history may significantly deviate from a flight plan even when performance of drone 20 is not low. Inspection timing determination unit 104 may determine an inspection timing in view of an increase in difference caused by collision avoidance.

In the present modification, sensor device 26 of drone 20 includes a sensor for detecting an obstacle, such as an image sensor, an infrared sensor, or a sensor for detecting an object by use of a millimeter wave. Drone 20 detects an obstacle by use of the sensor and a well-known technique. Upon detecting an obstacle, drone 20 makes a flight that deviates from a flight plan, to avoid the obstacle. Specifically, for example, drone 20 may fly around the obstacle or pause until the obstacle is no longer detected.

In the present modification, after drone 20 makes a flight to avoid an obstacle, flight history notification unit 204 of drone 20 sends flight history information indicating a start time and an end time of the avoidance flight. By receiving the flight history information, flight history acquisition unit 103 acquires a flight history indicating a time period of the avoidance flight. Inspection timing determination unit 104, when calculating a temporal or spatial difference, takes no account of the time period of the avoidance flight.

Inspection timing determination unit 104 determines an inspection timing based on a calculated temporal or spatial difference, as in the case of the above embodiment. In summary, in the present modification, inspection timing determination unit 104 of drone 20 having a function of avoiding a collision with an obstacle, subtracts a difference corresponding to a flight history of a time period of an avoidance flight from a difference between a total flight plan and a total flight history, and determines an inspection timing based on a result of the subtraction. The determination of an inspection timing may be performed for either the entirety of drone 20 or a component of drone 20.

In a case where drone 20 is provided with the avoidance function, a temporal or spatial difference increases in proportion to a number of avoidance flights performed by drone 20. If the avoidance flights are not considered, an earlier inspection timing may be determined even when performance of drone 20 is not low. The present modification facilitates determination of an inspection timing without being affected by a difference of a flight plan and a flight history caused by avoidance flights (or a difference caused regardless of performance of drone 20 or its component).

[2-3] Influence of Weather

A difference between a flight plan and a flight history may increase depending on a weather even when performance of drone 20 is not low. Inspection timing determination unit 104 may determine an inspection timing based on an increase in difference caused by a weather.

Figures 8, 9:
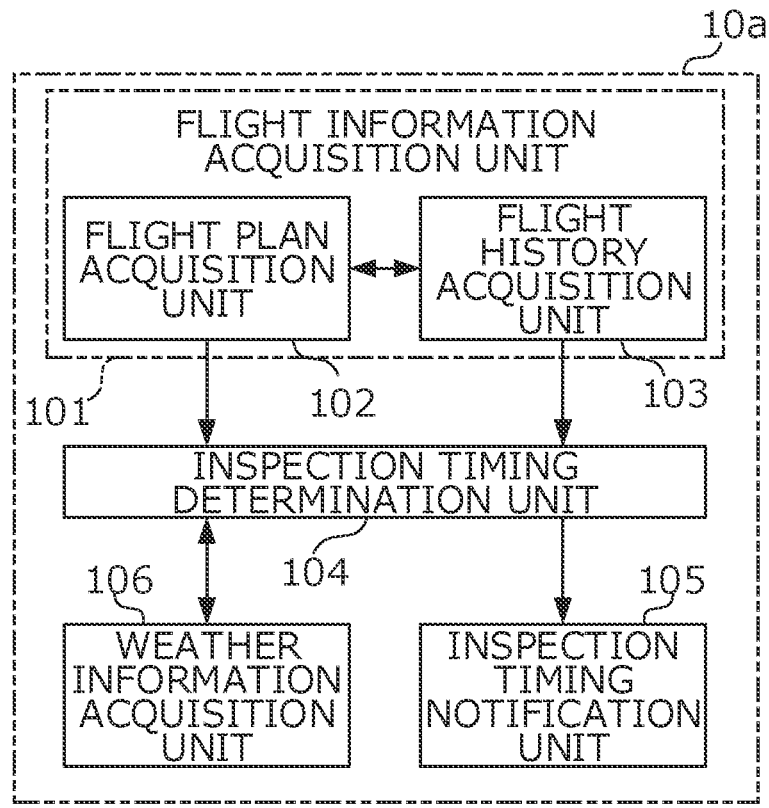
FIG. 8 is a diagram showing a functional configuration according to a modification in accordance to the present invention.
FIG. 9 is a diagram showing an example of a correction table in accordance to the present invention.

FIG. 8 shows a functional configuration according to the present modification. FIG. 8 shows server device 10*a* including weather information acquisition unit 106 in addition to the units shown in FIG. 4. In the present modification, inspection timing determination unit 104 requests weather information from weather information acquisition unit 106. The weather information indicates weather in an area including a flight route indicated by an acquired flight plan. Weather information acquisition unit 106 acquires the requested weather information, which is weather information indicating weather in an area where drone 20 is scheduled to fly.

For example, weather information acquisition unit 106 acquires weather information for an area including a flight route indicated by a flight plan, by use of a service that provides weather information (for example, a weather forecast or current weather information) on the Internet. Specifically, weather information acquisition unit 106 acquires weather information indicating a wind speed, a precipitation amount, or a snowfall amount for each hour (for example, an hour from 13:00 to 14:00), and provides the weather information to inspection timing determination unit 104.

Inspection timing determination unit 104, upon detecting that drone 20 has flown during a time period when there is specific weather, subtracts a difference made during the time period from a difference between a flight plan and a flight history, and determines an inspection timing based on a result of the subtraction. Specific weather herein refers to, for example, weather in which a wind speed, a precipitation amount, or snowfall amount is equal to or higher than a threshold value. In other words, specific weather refers to weather that causes a delay in arrival or a deviation in flight route even when performance of drone 20 is not low.

Inspection timing determination unit 104, upon detecting that the provided weather information indicates a time period during which a wind speed, a precipitation amount, or a snowfall amount is equal to or more than a threshold value, refrains from calculating a difference for a flight history of the time period, and calculates a difference for a flight history of the rest of the time. As a result of the calculation, a difference made during specific weather is subtracted from a difference between a flight plan and a flight history. Inspection timing determination unit 104 determines an inspection timing based on a result of the subtraction, as in the case of the above embodiment.

It is of note that specific weather may include weather in which a temperature is lower than a threshold value, because a low temperature may expedite battery consumption so that a deviation from a flight plan is increased. It is also of note that a wind speed, a precipitation amount, a snowfall amount, and a temperature may each be represented by a score. The score increases in proportion to a delay in arrival or a deviation in flight route caused by a weather element. Scores for all weather elements may be totaled, and when the total value is equal to or more than a threshold value, weather including those weather elements may be determined to be specific weather.

It is also of note that in the present modification, determination of an inspection timing may be performed for the entirety of drone 20 or a component of drone 20. In either case, an inspection timing can be determined without being affected by a difference caused by specific weather regardless of performance of drone 20 or its component.

[2-4] Difficulty Level of Flight Plan

When a flight plan has a high level of difficulty, a difference between the flight plan and a flight history is likely to be large even when performance of drone 20 is not low. A difficult level of a flight herein refers to, for example, a value that increases in proportion to closeness of a flight speed required to reach a destination to a maximum speed. Inspection timing determination unit 104 may determine an inspection timing based on a difficulty level of a flight plan.

Specifically, inspection timing determination unit 104 corrects a difference between a flight plan and a flight history based on a difficulty level of the flight plan. An amount of the correction increases in proportion to the difficulty level. After correcting the difference, inspection timing determination unit 104 determines an inspection timing based on the corrected difference. To make the determination, inspection timing determination unit 104 refers to, for example, a correction table in which speeds of a flight according to a flight plan are associated with difficulty levels and correction values. In the correction table, the difficulty levels are included for explanatory convenience; the difficulty levels may not be included in the correction table.

FIG. 9 shows an example of the correction table, in which a flight speed "80 percent or more of maximum speed" is associated with a highest difficulty level "Lv3" and a correction value "0.8." A flight speed "50 percent or more and less than 80 percent of maximum speed" is associated with a difficulty level "Lv2" and a correction value "0.9." A flight speed "less than 50 percent of maximum speed" is associated with a lowest difficulty level "Lv1" and a correction value "1.0."

Inspection timing determination unit 104 acquires a flight speed indicated by an acquired flight plan. When a flight speed is not indicated by an acquired flight plan, inspection timing determination unit 104 calculates an average flight speed from a flight distance and a flight time period. The calculated average flight speed can be said to be indirectly indicated by a flight plan. Inspection timing determination unit 104 may pre-store maximum speed information for drone 20, or may acquire maximum speed information for drone 20, together with a flight plan or a flight history.

Inspection timing determination unit 104 calculates a ratio of a flight speed indicated by a flight plan to a maximum speed, and retrieves a difficulty level and a correction value that are associated with the calculated ratio in the correction table. Inspection timing determination unit 104 corrects a difference calculated based on the flight plan by multiplying the difference by the retrieved correction value. Inspection timing determination unit 104 determines an inspection timing based on the corrected difference, as in the case of the above embodiment.

It is of note that a difficulty level of a flight plan may refer to another value. For example, a difficulty level may refer to a value that increases in proportion to a number of changes in direction in a flight route, or to a value that increases in proportion to closeness of a weight of an object transported by drone 20 to a maximum load weight. Alternatively, a difficulty level may refer to a value that increases in proportion to a degree of congestion in an airspace. The degree of congestion increases as more flight plans overlap in flight route and flight time period.

Alternatively, a difficulty level may refer to a value that increases in proportion to a narrowness of a flight airspace in which drone 20 is scheduled to fly. Alternatively, a difficulty level may refer to a value that increases in proportion to a number of airspaces where radio disturbance or interference is likely to occur, included in a flight route. An airspace herein refers to an airspace near a radio base station or a high-voltage power transmission line, or an airspace where radio shielding or radio reflection (multipath) is likely to occur due to buildings. Alternatively, a difficulty level may refer to a value that increases in proportion to a number of sites where strong winds are constantly blowing (through buildings).

In the present modification, determination of an inspection time may be performed for the entirety of drone 20 or a component of drone 20. In either case, an inspection timing can be determined without being affected by a difference caused due to a flight plan having a high difficulty level regardless of performance of drone 20 or its component.

[2-5] Creation of Flight Plan

A server device may create a flight plan.

Figures 10, 11, 12:
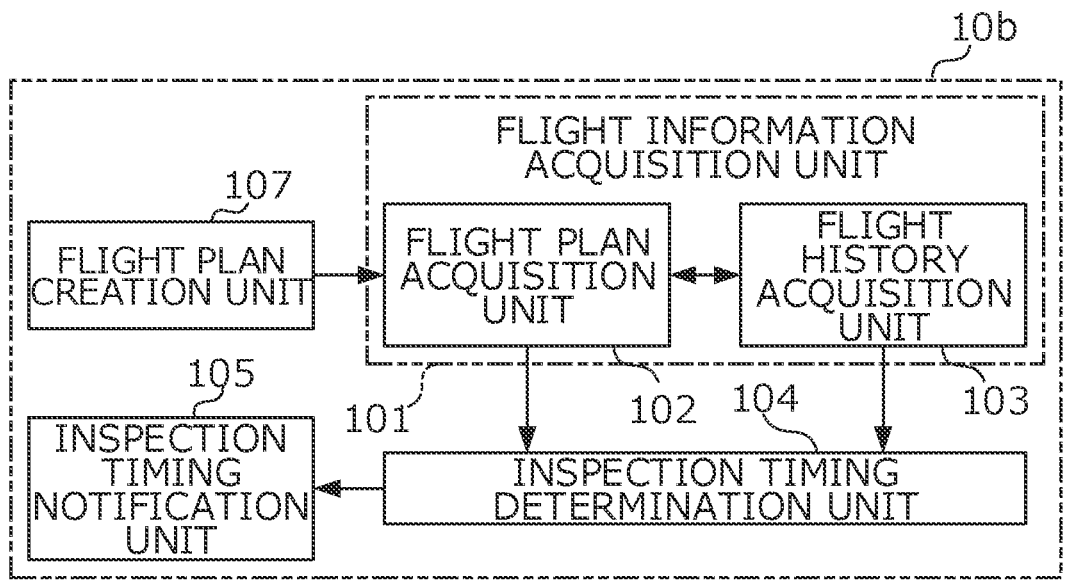
FIG. 10 is a diagram showing a functional configuration according to another modification in accordance to the present invention.
FIG. 11 is a diagram showing an example of a difficulty level table in accordance to the present invention.
FIG. 12 is a diagram showing an example of a correction table according to a modification in accordance to the present invention.

FIG. 10 shows a functional configuration according to the present modification. FIG. 10 shows server device 10$b$ including flight plan creation unit 107 in addition to the units shown in FIG. 4. In the present modification, server device 10$b$ receives request data indicating a request for creation of a flight plan from, for example, a system of a business operator who operates drone 20.

Request data that requests creation of a plan of a flight for transportation purpose indicates requirements such as a departure site, a transit site, waypoint, a destination, an estimated departure time, an estimated arrival time, a drone ID, and a maximum flight speed. Request data that requests creation of a flight for surveying purposes indicates requirements such as a range of a survey area and a maximum survey period. Flight plan creation unit 107 creates a flight plan (information indicating a flight route and a flight time period) that satisfies requirements indicated by the received request data.

Flight plan creation unit 107 sends the created flight plan to the system of the business operator, and also provides the flight plan to flight plan acquisition unit 102. Flight plan acquisition unit 102 acquires the provided flight plan. Flight plan creation unit 107 creates a flight plan having a different difficulty level, depending on requirements of a request. For example, upon detecting from requirements of a request that there is not enough time before an estimated arrival time, flight plan creation unit 107 creates a flight plan having a high difficulty level in which a flight speed close to a maximum speed is designated. In another example, upon detecting from requirements of a request that there is more than enough time before an estimated arrival time, flight plan creation unit 107 creates a flight plan having a low difficulty level.

Alternatively, flight plan creation unit 107, when creating a flight plan, may change a difficulty level of the flight plan depending on a time that has elapsed since drone 20 started to be used. The elapsed time of use herein is represented by, for example, a total flight time. An increase in total flight time would reduce performance of drone 20 so that drone 20 has more difficulty flying in accordance with a flight plan. In view of this, when creating a flight plan, flight plan creation unit 107 lowers a difficulty level of the flight plan in proportion to an amount of time that has elapsed since drone 20 started to be used. In that case, the system of the business operator sends request data indicating a time that has elapsed since drone 20 started to be used.

To create a flight plan, flight plan creation unit 107 refers to a difficulty level table in which elapsed times of use are associated with difficulty levels.

FIG. 11 shows an example of the difficulty level table, in which elapsed times of use "less than T11," "T11 or more and less than T12," and "T12 or more" are associated with difficulty levels "Lv3," "Lv2," and "Lv1," respectively.

Flight plan creation unit 107, upon acquiring request data indicating an elapsed time of use, creates a flight plan having a difficulty level associated with the elapsed time of use in the difficulty level table. By adjusting a difficulty level in a situation where a long flight time has elapsed so that performance of drone 20 is low, it is made easier to keep to a flight plan, compared to a case where a difficulty level is not adjusted. It is of note that an elapsed time of use may be represented by a time that has elapsed including a non-flying time, instead of a total flight time.

For example, a battery deteriorates over time even when drone 20 is not flying; accordingly, an increase in elapsed time including a non-flying time would make it difficult to fly in accordance with a flight plan. It is also of note that, depending on requirements, it may not be possible to create a flight plan having a corresponding difficulty level, for example, because if a difficulty level is set to Lv1, drone 20 would miss an estimated arrival time. In that case, flight plan creation unit 107 may give priority to requirements when creating a flight plan.

[2-6] Adjustment of Difficulty Level

Adjusting a difficulty level of a flight plan according to an elapsed time of use would reduce a difference between the flight plan and a flight history caused by low performance of drone 20. Inspection timing determination unit 104, upon acquiring a flight plan whose difficulty level has been lowered according to an elapsed time of use, may take the adjustment of the difficulty level into account when determining an inspection timing.

Specifically, inspection timing determination unit 104 corrects a difference between a flight plan and a flight history based on an elapsed time of use. An amount of the correction decreases in proportion to the elapsed time of use. After correcting the difference, inspection timing determination unit 104 determines an inspection timing based on the corrected difference. To make the determination, inspection timing determination unit 104 refers to a correction table in which elapsed times of use are associated with correction values.

FIG. 12 shows an example of the correction table according to the present modification, in which elapsed times of use "less than T21," "T21 or more and less than T22," and "T22 or more" are associated with correction values "1.0," "1.1," and "1.2," respectively.

In the present modification, flight history notification unit 204 of drone 20 sends flight history information indicating an elapsed time of use. Flight history acquisition unit 103 acquires the flight history information. Inspection timing determination unit 104 retrieves a correction value associated with the elapsed time of use indicated by the acquired flight history information from the correction table. Inspection timing determination unit 104 calculates a difference between a flight plan and a flight history, and corrects the difference by multiplying the difference by the retrieved correction value.

For example, upon acquiring an elapsed time of use equal to or greater than T22, inspection timing determination unit 104 corrects a calculated difference by multiplying the difference by a correction value "1.2," and determines an inspection timing based on the corrected difference, as in the case of the above embodiment. By correcting a difference in a situation where a flight plan whose difficulty level has been lowered according to an elapsed time of use, an appropriate inspection timing can be determined, compared to a case where the correction is not made.

Drone 20 includes plural components such as processor 21, motors 251, rotors 252, sensor device 26, battery 27, and frame 30, as described above. Those components are replaced with new ones at different timings; accordingly, the components have different performance levels. In view of this, when creating a flight plan, flight plan creation unit 107 may lower a difficult level of the flight plan in proportion to a time that has elapsed since a component(s) of drone started to be used.

For example, flight plan creation unit 107 identifies, for each of components, a time that has elapsed since the component started to be used, and calculates an average of the identified elapsed times of use. Flight plan creation unit 107 uses the calculated average as an elapsed time of use, to determine a difficulty level of a flight plan with reference to the difficulty level table shown in FIG. 11. In that case, inspection timing determination unit 104 corrects a difference between a flight plan and a flight history based on the elapsed time of use and an importance level(s) of the components. An amount of correction decreases in proportion to an elapsed time of use and an importance level of a component(s). After correcting the difference, inspection timing determination unit 104 determines an inspection timing based on the corrected difference.

To make the determination, inspection timing determination unit 104 refers to a correction table in which components are associated with correction values.

Figures 13, 14, 15:
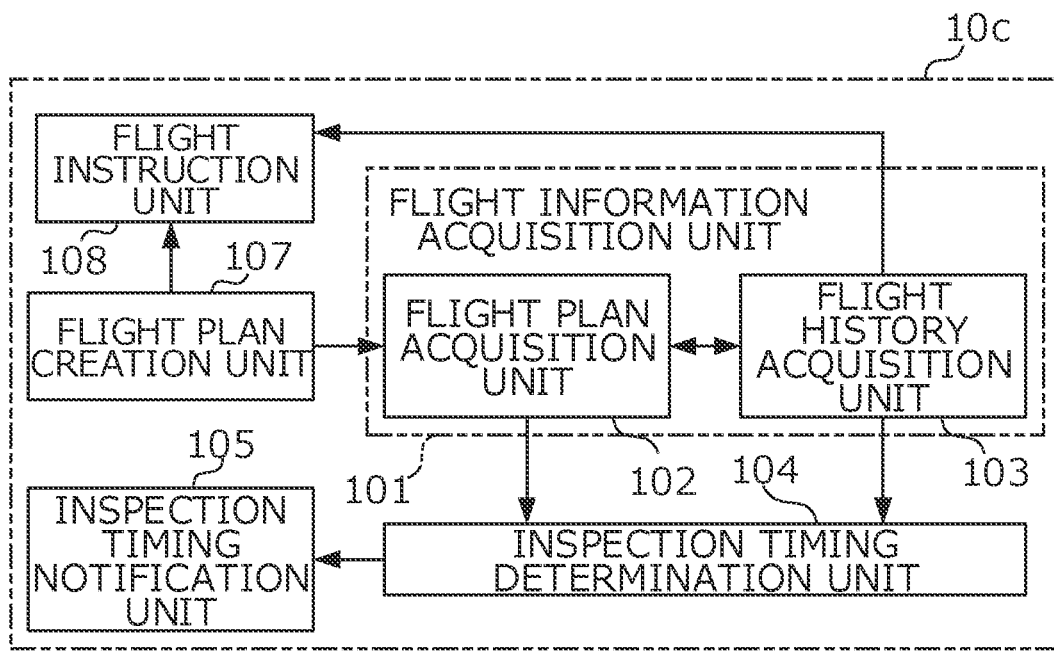
FIG. 13 is a diagram showing an example of a correction table according to another modification in accordance to the present invention.
FIG. 14 is a diagram showing a functional configuration according to another modification in accordance to the present invention.
FIG. 15 is a diagram showing an example of an inspection timing table according to a modification in accordance to the present invention.

FIG. 13 shows an example of another correction table according to the present modification, in which a component(s) "frame," "battery, sensor device," and "motors, rotors, processor" are associated with correction values "1.0," "1.2," and "1.4." FIG. 13 shows that components "battery, sensor device" are more important than "frame," and components "motors, rotors, processor" are more important than "battery, sensor device."

In the present modification, flight history notification unit 204 of drone 20 sends flight history information indicating components and elapsed times of use corresponding to the components. Flight history information is sent by each of drones 20, and components whose elapsed times of use are indicated by flight history information differ for each drone 20.

Flight history acquisition unit 103, upon receiving flight history information, acquires elapsed times of use for components indicated by the flight history information. Inspection timing determination unit 104 calculates an average of the acquired elapsed times of use, and retrieves a correction value associated with the average in the correction table shown in FIG. 12, as a flight-time-related correction value. Inspection timing determination unit 104 also retrieves correction values associated with components indicated by the flight history information from the correction table shown in FIG. 13, and calculates an average of the retrieved correction values as a component-related correction value.

Inspection timing determination unit 104 calculates a difference between a flight plan and a flight history, and corrects the calculated difference by multiplying the difference by the flight-time-related correction value and the component-related correction value. Inspection timing determination unit 104 determines an inspection timing based on the corrected difference, as in the above embodiment. In the present modification, an amount of a correction made to a difference decreases in proportion to an importance level(s) of a components for which an average of elapsed times of use is calculated. Accordingly, an early inspection timing is determined for an important component so that a delay in replacement of the component does not cause a problem.

[2-7] Flight Instruction

The server device may provide a flight instruction to drone 20.

FIG. 14 shows a functional configuration according to the present modification. FIG. 14 shows server device 10c including flight instruction unit 108 in addition to the units shown in FIG. 10. In the present modification, flight plan creation unit 107 provides a created flight plan to flight instruction unit 108, and flight history acquisition unit 103 provides an acquired flight history to flight instruction unit 108.

Flight instruction unit 108 instructs drone 20 making an autonomous flight based on a flight plan, to make a flight not following the flight plan. Flight instruction unit 108, for example, compares the flight plan with a flight history, and determines whether a degree of approximation to the flight plan is smaller than a threshold value. Upon determining that the degree of approximation is smaller than the threshold value, flight instruction unit 108 determines that drone 20 is not in a condition that it can fly in accordance with the flight plan. Upon making the determination, flight instruction unit 108 instructs drone 20 to fly along a different route at a different flight speed from those of the flight plan.

For example, flight instruction unit 108 instructs drone 20 to skip a transit point indicated in the flight plan to reach a destination in a shorter distance. In another example, flight instruction unit 108 instructs drone 20 to fly at a slower flight speed, although drone 20 would arrive at a destination later than an estimated arrival time indicated in the flight plan. When an unexpected event (for example, a failure) occurs in drone 20, by allowing drone 20 to fly in accordance with a present situation, not an original flight plan, a risk of a crash is reduced, compared to a case where the original flight plan is kept to.

[2-8] Unplanned Flight

In the modification shown in FIG. 14, drone 20 may make a flight (an unplanned flight) not following a flight plan. In the modification, inspection timing determination unit 104 may determine an inspection timing based on, in addition to or instead of a difference between the flight plan and a flight history, another difference. In the present modification, a flight plan and a flight history are acquired for each of drones 20, which are classified into groups by flight performance.

A flight performance is represented by information such as a maximum speed, a maximum acceleration, a maximum load weight, a battery capacity, and a sensor accuracy. Server device 10c pre-stores a list of drones 20 in which the drones 20 have been classified into groups by flight performance. The list herein refers to, for example, a list of drones 20 in which drones 20 of a same product, drones 20 belonging to a same product series, or drones 20 belonging to a group of products having common performance are grouped. In the present modification, flight history acquisition unit 103 acquires, in addition to a history (a planned-flight history) of a flight following a flight plan, a history (an unplanned-flight history) of an unplanned flight (for example, a flight made in accordance with an instruction provided by flight instruction unit 108, not an original flight plan).

Flight history acquisition unit 103 stores the acquired planned-flight history and the acquired unplanned-flight history in association with a corresponding drone ID. As for the planned-flight history, inspection timing determination unit 104 calculates a difference between the planned-flight history and a flight plan, as in the case of each of the above embodiments. As for the unplanned-flight history, inspection timing determination unit 104 calculates a difference between the unplanned-flight history and a flight history of another drone 20 that belongs to a same group as drone 20 having the drone ID.

Specifically, upon acquiring the unplanned-flight history of the drone 20, inspection timing determination unit 104 retrieves a drone ID of another drone 20 that belongs to a same group as the drone 20 from the above list. Subsequently, inspection timing determination unit 104 requests a flight history (a planned-flight history and an unplanned-flight history) stored in association with the retrieved drone ID from flight history acquisition unit 103, and acquires the flight history provided in response to the request.

Inspection timing determination unit 104 calculates a value (a flight performance value) indicating flight performance based on the acquired flight history. The flight performance value refers to, for example, a maximum flight speed, a maximum acceleration, or a maximum climb speed of the other drone 20. Inspection timing determination unit 104 also calculates a flight performance value based on the unplanned-flight history of the drone 20. Subsequently, inspection timing determination unit 104 calculates a difference between the flight performance value of the other drone 20 and the flight performance value of the drone 20.

Inspection timing determination unit 104 also calculates a difference between the planned-flight history and a flight plan. Inspection timing determination unit 104 determines an inspection timing based on the difference calculated for the unplanned-flight history and the difference calculated for the planned-flight history. To make the determination, inspection timing determination unit 104 refers to, for example, an inspection timing table, whereby an inspection timing is determined based on an unplanned-flight history.

FIG. 15 shows an example of the inspection time table according to the present modification, in which ranges of a difference for an unplanned-flight history "less than Th31," "Th31 or more and less than Th32," and "Th32 or more" are associated with inspection timings "not necessary yet," "after flight time T3," and "now," respectively. Inspection timing determination unit 104 retrieves an inspection timing associated with the difference calculated for the unplanned-flight history from the inspection timing table.

Inspection timing determination unit 104 also retrieves an inspection timing associated with the difference calculated for the planned-flight history from the inspection timing table shown in FIG. 5. Subsequently, inspection timing determination unit 104 determines an earlier one of the retrieved inspection timings to be an inspection timing. In summary, inspection timing determination unit 104, for drone 20 whose unplanned-flight history has been acquired, determines an inspection timing based on a difference between the unplanned-flight history and a flight history of another drone 20 that belongs to a same group as the drone 20.

An unplanned flight is a flight not following a flight plan; accordingly, a flight history of the unplanned flight deviates from a flight plan. However, the deviation does not indicate an amount of decrease in performance of drone 20. On the other hand, a difference between flight histories of drones 20 having same flight performance indicates an amount of decrease in performance of drone 20. In the present modification, by using a difference calculated based on an unplanned-flight history, the difference indicating an amount of decrease in performance of drone 20, an appropriate inspection timing can be determined for the drone 20, compared to a case where the difference is not used.

[2-9] Aerial Vehicle

In the above embodiment where a rotary-wing aerial vehicle is used, another type of autonomous aerial vehicle may be used. For example, an airplane-type aerial vehicle or a helicopter-type aerial vehicle may be used. A function of autonomous flight is not essential. A radio-controlled aerial vehicle that is remotely operated by an operator, and can travel through an assigned airspace within an assigned time period may be used.

[2-10] Devices that Provide Functions

Functions shown in figures such as FIG. 4 may be provided in a different device. For example, a drone may have all or a part of the functions provided in the server device. For example, a drone may acquire a flight plan and a flight history to determine an inspection timing. In that case, the drone corresponds to an example of an "information-processing device" according to the present invention. Alternatively, operations performed by each function may be performed by another function. For example, inspection timing determination unit 104 may perform an operation for notifying an inspection time, performed by inspection timing notification unit 105.

Alternatively, inspection timing notification unit 105 may be divided into a function for generating notification data and a function for sending notification data. Alternatively, each of the functions provided in the server device may be distributed among two or more devices. For example, flight plan creation unit 107 and flight instruction unit 108 which are shown in FIG. 14 may be provided in the system of the business operator. In short, the drone management system may include any number of devices as long as the system provides necessary functions.

[2-11] Category of Invention

The present invention may be implemented as an information-processing device (specifically, a server device), as an aerial vehicle (specifically, a drone, which may also serve as the information-processing device), or as a drone management system including the information-processing device and the aerial vehicle. The present invention also may be implemented as an information-processing method for causing each device to perform processing, or as a program for causing a computer to control each device. The program may be provided in the form of a recording medium such as an optical disk. Alternatively, the program may be downloaded to and installed in a computer via a network such the Internet.

[2-12] Procedures

The order of the processes, sequence, or flowcharts in the embodiments described in the present specification may be changed as long as consistency is maintained. Methods described in the present specification include steps arranged in an exemplary order, but the steps may be arranged in another order.

[2-13] Handling of Input/Output Information

Input or output information may be stored in a location such as memory, or may be managed in a management table. Input or output information may be overwritten, updated, or additionally written. Output information may be deleted. Input information may be sent to another device.

[2-14] Software

Software should be interpreted broadly to include instructions, instruction sets, codes, code segments, program codes, a program, a subprogram, software modules, an application, a software application, a software package, a routine, a subroutine, an object, an executable file, an execution thread, a procedure, and a function, regardless of whether it is referred to as software, firmware, middleware, microcode, hardware description language, or by any other name.

Software and instructions may be sent and received via a transmission medium. For example, software may be sent from a website, a server, or another remote source, using a wired medium such as a coaxial cable, a fiber optic cable, a twisted pair, or a digital subscriber line (DSL), and/or a wireless medium such as infrared, wireless, or microwave. The wired medium and the wireless medium are included within the definition of a transmission medium.

[2-15] Information, Signal

Information and signals described in the present specification may be represented using any of various technologies. For example, data, instructions, commands, information, signals, bits, symbols, and chips that are described in the foregoing, may be represented by voltages, currents, electromagnetic waves, magnetic fields or particles, optical fields or photons, or any Combination Thereof.

[2-16] System, Network

The terms "system" and "network" described in the present specification may be interchanged.

[2-17] Meaning of "Based On"

The description "based on" used in the present specification does not mean "based only on," unless explicitly stated otherwise. In other words, the description "based on" means both "based only on" and "based at least on."

[2-18] "and," "Or"

In a description "A and B" or "A or B" appearing in the present specification, the conjunction "and" or "or" may be interchanged with the other as long as it does not cause inconsistency with the other descriptions.

[2-19] Variations of Embodiment

The embodiments described in the present specification may be used separately or in combination, with minor changes. A notification of information (for example, a notification of "being X") may be made explicitly or implicitly.

The present invention is described in detail in the foregoing; however, it is apparent to those ordinarily skilled in the art that the present invention is not limited to the embodiments described in the present specification. The present invention may be implemented in modified or changed embodiments, without departing from the spirit and scope of the present invention defined by the description of the claims. The description in the present specification is for illustrative purposes and is not intended to limit the present invention in any way.

DESCRIPTION OF REFERENCE NUMERALS 1 drone management system
10 server device
20 drone
101 flight information acquisition unit
102 flight plan acquisition unit
103 flight history acquisition unit
104 inspection timing determination unit
105 inspection timing notification unit
106 weather information acquisition unit
107 flight plan creation unit
108 flight instruction unit
201 flight control unit
202 flight unit
203 sensor measurement unit
204 flight history notification unit
205 lamp control unit

What is claimed is:

1. An information-processing device comprising:
memory configured to:
store a first inspection timing table in which different first inspection timings are associated with a respective range of temporal differences, wherein a temporal difference is a difference between an estimated time of arrival of an aerial vehicle at a destination or a transit point of a flight route defined in a flight plan and actual arrival time of the aerial vehicle at the destination or the transit point indicated in a flight history of the aerial vehicle flown according to the flight plan,
store a second inspection timing table in which different second inspection timings are associated with a respective range of spatial differences, wherein a spatial difference is a distance between the flight route defined in the flight plan and an actual flight route indicated in the flight history of the aerial vehicle flown according to the flight plan; and
wherein the first inspection timings and the second inspection timings are defined by a predetermined amount of flight time after completion of a flight of the aerial vehicle; and
a processor configured to:
acquire the flight plan and the flight history of the flight of the aerial vehicle, the flight history being a history of the flight made by the aerial vehicle flown according to the flight plan;
calculate a temporal difference that is a difference between the estimated time of arrival of the aerial vehicle at the destination or the transit point of the flight route defined in the flight plan and the actual arrival time of the aerial vehicle at the destination or the transit point indicated in the flight history of the aerial vehicle flown according to the flight plan;
determine a first inspection timing for inspecting the aerial vehicle based on the first inspection timing table stored in memory and the calculated temporal difference;
calculate a spatial difference that is a distance between the flight route defined in the flight plan and the actual flight route indicated in the flight history of the aerial vehicle flown according to the flight plan;
determine a second inspection timing for inspecting the aerial vehicle based on the second inspection timing table stored in memory and the calculated spatial difference;
determine a resulting inspection timing for inspecting the aerial vehicle by selecting the earlier of the determined first inspection timing and the determined second inspection timing; and
control the flight of the aerial vehicle based on the calculated temporal difference or the calculated spatial difference between the flight plan and the flight history.

2. The information-processing device according to claim 1,
wherein the flight plan and the flight history include plural items;
wherein a difference is calculated for each of the plural items; and
wherein the processor is further configured to determine, based on a difference calculated for one of the plural items, one of a plurality of predetermined different temporal or spatial inspection timings for a component of the aerial vehicle, the component corresponding to the one of the plural items.

3. The information-processing device according to claim 1,
wherein the aerial vehicle has a function of avoiding a collision with an obstacle; and
wherein the processor is further configured to subtract a temporal difference and a spatial difference caused by avoiding a collision with an obstacle from the respective calculated temporal difference and the calculated spatial difference, and to determine the first inspection timing and the second inspection timing based on a result of the subtraction.

4. The information-processing device according to claim 1, wherein the processor is further configured, upon detecting that the aerial vehicle has flown during a time period when there is specific weather, to subtract a temporal difference and a spatial difference made during the time period from the respective calculated temporal difference and the calculated spatial difference, and to determine the first inspection timing and the second inspection timing based on a result of the subtraction.

5. The information-processing device according to claim 1, wherein the processor is further configured to: correct the calculated temporal difference and the calculated spatial difference based on a difficulty level of the flight plan, an amount of correction increasing in proportion to the difficulty level; and to determine the first inspection timing and the second inspection timing based on the corrected difference.

6. The information-processing device according to claim 1,
wherein the flight plan is a flight plan whose difficulty level has been lowered in accordance with a time that has elapsed since the aerial vehicle started to be used; and
wherein the processor is further configured to correct the calculated temporal difference and the calculated spatial difference based on the elapsed time, an amount of correction decreasing in proportion to the elapsed time; and to determine the first inspection timing and the second inspection timing based on the corrected difference.

7. The information-processing device according to claim 1,
wherein the flight plan is a flight plan whose difficulty level has been lowered in accordance with a time that has elapsed since a component of the aerial vehicle started to be used; and
wherein the processor is further configured to correct the calculated temporal difference and the calculated spatial difference based on the elapsed time and an importance level of the component, an amount of correction decreasing in proportion to the elapsed time and the importance level; and to determine the first inspection timing and the second inspection timing based on the corrected difference.

8. The information-processing device according to claim 1,
wherein the aerial vehicle is one of aerial vehicles that are classified into groups by flight performance; and
wherein the processor is further configured to:
acquire an unplanned-flight history for the aerial vehicle, the unplanned-flight history being a history of flight not following the flight plan; and
determine one of a plurality of predetermined different temporal or spatial inspection timings based on the calculated temporal difference and the calculated spatial difference and a difference between the unplanned-flight history for the aerial vehicle and a flight history of another aerial vehicle that belongs to a same group as the aerial vehicle.

9. The information-processing device according to claim 1, wherein the processor is further configured to determine one of the different first inspection timings or different second inspection timings to be a future timing after a predetermined flight time, when the calculated temporal difference or the calculated spatial difference between the flight plan and the flight history is less than a threshold.

10. The information-processing device according to claim 1, wherein the processor is further configured to determine one of the different first inspection timings or different second inspection timings after completion of the flight of the aerial vehicle.

11. The information-processing device according to claim 1, wherein the processor is further configured to determine one of the different first inspection timings or different second inspection timings based further on increase in difference caused by collision avoidance by the aerial vehicle.

12. The information-processing device according to claim 1, wherein the processor is further configured to determine one of the different first inspection timings or different second inspection timings based further on increase in difference caused by weather during the flight of the aerial vehicle.

13. The information-processing device according to claim 1, wherein the first inspection timing is for inspection of a first component of the aerial vehicle based on the calculated temporal difference; and wherein the second inspection timing is for inspection of a second component that is different from the first component of the aerial vehicle based on the calculated spatial difference.

14. An information-processing method comprising:
storing in memory a first inspection timing table in which different first inspection timings are associated with a respective range of temporal differences, wherein a temporal difference is a difference between an estimated time of arrival of an aerial vehicle at a destination or a transit point of a flight route defined in a flight plan and actual arrival time of the aerial vehicle at the destination or the transit point indicated in a flight history of the aerial vehicle flown according to the flight plan,
storing in memory a second inspection timing table in which different second inspection timings are associated with a respective range of spatial differences, wherein a spatial difference is a distance between the flight route defined in the flight plan and an actual flight route indicated in the flight history of the aerial vehicle flown according to the flight plan;
wherein the first inspection timings and the second inspection timings are defined by a predetermined amount of flight time after completion of a flight of the aerial vehicle; and
acquiring the flight plan and the flight history of the flight on the aerial vehicle, the flight history being a history of the flight made by the aerial vehicle flown according to the flight plan;
calculating a temporal difference that is a difference between the estimated time of arrival of the aerial vehicle at the destination or the transit point of the flight route defined in the flight plan and the actual arrival time of the aerial vehicle at the destination or the transit point indicated in the flight history of the aerial vehicle flown according to the flight plan;
determining a first inspection timing for inspecting the aerial vehicle based on the first inspection timing table stored in memory and the calculated temporal difference;
calculating a spatial difference that is a distance between the flight route defined in the flight plan and the actual flight route indicated in the flight history of the aerial vehicle flown according to the flight plan;
determining a second inspection timing for inspecting the aerial vehicle based on the second inspection timing table stored in memory and the calculated spatial difference;
determining a resulting inspection timing for inspecting the aerial vehicle by selecting the earlier of the determined first inspection timing and the determined second inspection timing; and
controlling the flight of the aerial vehicle based on the calculated temporal difference or the calculated spatial difference between the flight plan and the flight history.

15. The information-processing method according to claim 14, further comprising determining one of the different first inspection timings or different second inspection timings to be a future timing after a predetermined flight time, when the calculated temporal difference or the calculated spatial difference between the flight plan and the flight history is less than a threshold.

16. The information-processing method according to claim 14, further comprising determining one of the different first inspection timings or different second inspection timings after completion of the flight of the aerial vehicle.

17. The information-processing method according to claim 14, further comprising determining one of the different first inspection timings or different second inspection timings based further on increase in difference caused by collision avoidance by the aerial vehicle.

18. The information-processing method according to claim 14, further comprising determining one of the different first inspection timings or different second inspection timings based further on increase in difference caused by weather during the flight of the aerial vehicle.

19. The information-processing device according to claim 14, wherein the first inspection timing is for inspection of a first component of the aerial vehicle based on the calculated temporal difference; and wherein the second inspection timing is for inspection of a second component that is different from the first component of the aerial vehicle based on the calculated spatial difference.

\* \* \* \* \*